United States Patent
Ku et al.

(10) Patent No.: US 9,733,761 B2
(45) Date of Patent: Aug. 15, 2017

(54) TOUCH SENSOR DEVICE AND DISPLAY DEVICE INCLUDING THE SAME

(71) Applicant: Samsung Display Co., Ltd., Yongin (KR)

(72) Inventors: Ja Seung Ku, Seoul (KR); Hassan Kamal, Suwon-si (KR); Ji Hye Shin, Cheonan-si (KR); Soon Sung Ahn, Cheonan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 35 days.

(21) Appl. No.: 14/854,532

(22) Filed: Sep. 15, 2015

(65) Prior Publication Data

US 2016/0196001 A1 Jul. 7, 2016

(30) Foreign Application Priority Data

Jan. 6, 2015 (KR) .......................... 10-2015-0001322

(51) Int. Cl.
*G06F 3/041* (2006.01)
*G06F 3/044* (2006.01)

(52) U.S. Cl.
CPC ............ *G06F 3/0418* (2013.01); *G06F 3/044* (2013.01); *G06F 3/0412* (2013.01); *G06F 3/0416* (2013.01)

(58) Field of Classification Search
CPC .... G06F 3/0418; G06F 3/0412; G06F 3/0416; G06F 3/044
See application file for complete search history.

(56) References Cited

U.S. PATENT DOCUMENTS

| 8,319,747 | B2 | 11/2012 | Hotelling et al. |
| 2011/0279409 | A1 | 11/2011 | Salaverry et al. |
| 2011/0310038 | A1 | 12/2011 | Park et al. |
| 2012/0200530 | A1 | 8/2012 | Wu et al. |
| 2013/0181942 | A1* | 7/2013 | Bulea ...................... G06F 3/044 345/174 |

(Continued)

FOREIGN PATENT DOCUMENTS

KR 10-2014-0010859 1/2014

OTHER PUBLICATIONS

European Search Report dated May 11, 2016 in European Patent Application No. 15190696.3.

*Primary Examiner* — Kevin M Nguyen
(74) *Attorney, Agent, or Firm* — H.C. Park & Associates, PLC

(57) ABSTRACT

A touch sensor device includes first electrode patterns arranged in a first direction and physically separated first electrode cells; second electrode patterns arranged in a second direction crossing the first direction and includes physically separated second electrode cells; first touch signal lines connected to the first electrode cells; second touch signal lines connected to the second electrode cells; and a touch sensor controller connected with the first touch signal lines and the second touch signal lines. The first electrode cell and the second electrode cell adjacent in the first direction form a channel for generating position information by a mutual capacitive method. The touch sensor controller stores a ghost table including a ghost ratio for each channel for a touch position, and removes a ghost from measured touch data by using the ghost table to generate final touch data.

20 Claims, 14 Drawing Sheets

(56) References Cited

U.S. PATENT DOCUMENTS

| | | |
|---|---|---|
| 2014/0002409 A1* | 1/2014 | Rohozin ............... G06F 3/0488 |
| | | 345/174 |
| 2014/0022201 A1 | 1/2014 | Boychuk et al. |
| 2014/0146005 A1 | 5/2014 | Hong et al. |
| 2014/0176484 A1 | 6/2014 | Tsai et al. |
| 2014/0267070 A1* | 9/2014 | Shahparnia ............. G06F 3/046 |
| | | 345/173 |

* cited by examiner

FIG. 4

| | Column k | Touch position | | | | | | |
|---|---|---|---|---|---|---|---|---|
| | | CH1 | CH2 | CH3 | CH4 | ... | CHn | |
| Column 1 | | Touch position | | | | | | GR1_n |
| | | CH1 | CH2 | CH3 | CH4 | ... | CHn | GR2_n |
| Ghost ratio | CH1 | GR1_1 | GR1_2 | GR1_3 | GR1_4 | ... | GR1_n | GR3_n |
| | CH2 | GR2_1 | GR2_2 | GR2_3 | GR2_4 | ... | GR2_n | GR4_n |
| | CH3 | GR3_1 | GR3_2 | GR3_3 | GR3_4 | ... | GR3_n | ... |
| | CH4 | GR4_1 | GR4_2 | GR4_3 | GR4_4 | ... | GR4_n | GRn_n |
| | ... | ... | ... | ... | ... | ... | ... | |
| | CHn | GRn_1 | GRn_2 | GRn_3 | GRn_4 | ... | GRn_n | |

FIG. 5

| ∴ | Column k | Touch position | | | | | | CHn | |
|---|---|---|---|---|---|---|---|---|---|
| | | CH1 | CH2 | CH3 | CH4 | ... | CHn | | |
| Column 1 | | Touch position | | | | | | GRn | |
| | | CH1 | CH2 | CH3 | CH4 | ... | CHn | | |
| Ghost ratio | GRA | GR1 | GR2 | GR3 | GR4 | ... | GRn | | ∴ |

FIG. 6

| | Column k | Touch position | | | | | |
|---|---|---|---|---|---|---|---|
| ∴ | | CH1 | CH2 | CH3 | CH4 | ... | CHn |
| | Column 1 | Touch position | | | | | GR1_n |
| | | CH1 | CH2 | CH3 | CH4 | ... | CHn | GR2_n |
| Ghost ratio | GRA1 | GR1_1 | GR1_2 | GR1_3 | GR1_4 | ... | GR1_n | ∴ |
| | GRA2 | GR2_1 | GR2_2 | GR2_3 | GR2_4 | ... | GR2_n | |

TOUCH SENSOR DEVICE AND DISPLAY DEVICE INCLUDING THE SAME

CROSS REFERENCE TO RELATED APPLICATION

This application claims priority from and the benefit of Korean Patent Application No. 10-2015-0001322, filed on Jan. 6, 2015, which is hereby incorporated by reference for all purposes as if fully set forth herein.

BACKGROUND

Field

Exemplary embodiments relate to a touch sensor device and a display device including the same.

Discussion of the Background

In general, a display panel of a liquid crystal display (LCD), an organic light emitting diode display, and the like, includes a plurality of gate lines and a plurality of data lines connected to a plurality of pixels. The plurality of pixels is formed at crossing points of the gate lines and the data lines. When a gate signal having a gate-on voltage is sequentially applied to the plurality of gate lines, a data voltage is applied to the plurality of data lines in response to the gate signal having the gate-on voltage, so that image data is written in the plurality of pixels.

A touch sensor device is an input device for recognizing a touch position of a user and inputting a command of the user. The touch sensor device is typically provided on a front surface of the display panel, and recognizes a position of a touch by a hand or an object to determine an input signal. A capacitive method is a widely used implementation for such touch sensor devices. The capacitive method is a method of detecting a change in capacitance formed between an electrode and a conductive object, such as a finger, when the touch sensor is touched.

In the capacitive method, touch electrodes and wires may be formed in a single layer, and thus the touch sensor device may be formed to be very thin. However, when the touch electrodes and the wires are formed on a single layer, the wires connected to the respective touch electrodes are formed for each corresponding touch electrode. Thus, an area of the wire connected to each touch electrode increases, so that an area of the touch electrode may be inevitably limited due to the increase in the area of the wire, and touch sensitivity may also be reduced.

The above information disclosed in this Background section is only for enhancement of understanding of the background of the invention and therefore it may contain information that does not form the prior art that is already known in this country to a person of ordinary skill in the art.

SUMMARY

Exemplary embodiments provide a touch sensor device capable of improving touch sensitivity by removing ghost data, and a display device including the same.

Additional aspects will be set forth in the detailed description which follows, and, in part, will be apparent from the disclosure, or may be learned by practice of the inventive concept.

An exemplary embodiment discloses a touch sensor device, including: a plurality of first electrode patterns arranged in a first direction and including a plurality of physically separated first electrode cells, respectively; a plurality of second electrode patterns, arranged in a second direction crossing the first direction and including a plurality of physically separated second electrode cells, respectively; a plurality of first touch signal lines connected to the plurality of first electrode cells; a plurality of second touch signal lines connected to the plurality of second electrode cells; and a touch sensor controller connected with the plurality of first touch signal lines and the plurality of second touch signal line. The plurality of first electrode patterns, the plurality of second electrode patterns, the plurality of first touch signal lines, and the plurality of second touch signal lines are positioned on the same layer, and the first electrode cell and the second electrode cell adjacent in the first direction form a channel for generating position information by a mutual capacitive method. The touch sensor controller stores a ghost table including a ghost ratio for each channel for a touch position, and removes a ghost from measured touch data by using the ghost table to generate final touch data.

An exemplary embodiment of the present invention also discloses a display device, including: a display panel which displays an image; a plurality of first electrode patterns arranged in a first direction in a touch area overlapping a display area, in which the image is displayed, and includes a plurality of physically separated first electrode cells, respectively. A plurality of second electrode patterns arranged in a second direction crossing the first direction in the touch area and includes a plurality of physically separated second electrode cells, respectively. A plurality of first touch signal lines are connected to the plurality of first electrode cells. A plurality of second touch signal lines are connected to the plurality of second electrode cells. A touch sensor controller are connected with the plurality of first touch signal lines and the plurality of second touch signal lines, in which the plurality of first electrode patterns, the plurality of second electrode patterns, the plurality of first touch signal lines, and the plurality of second touch signal lines are positioned on the same layer, and the first electrode cell and the second electrode cell adjacent in the first direction form a channel for generating position information by a mutual capacitive method. The touch sensor controller stores a ghost table including a ghost ratio for each channel for a touch position, and removes a ghost from measured touch data by using the ghost table to generate final touch data.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the inventive concept, and are incorporated in and constitute a part of this specification, illustrate exemplary embodiments of the inventive concept, and, together with the description, serve to explain principles of the inventive concept.

FIG. 4 is a diagram illustrating an example of a ghost table for removing a ghost according to an exemplary embodiment.

FIG. 5 is a diagram illustrating another example of a ghost table for removing a ghost according to an exemplary embodiment.

FIG. 6 is a diagram illustrating yet another example of a ghost table for removing a ghost according to an exemplary embodiment.

DETAILED DESCRIPTION OF THE ILLUSTRATED EMBODIMENTS

Figure 1:
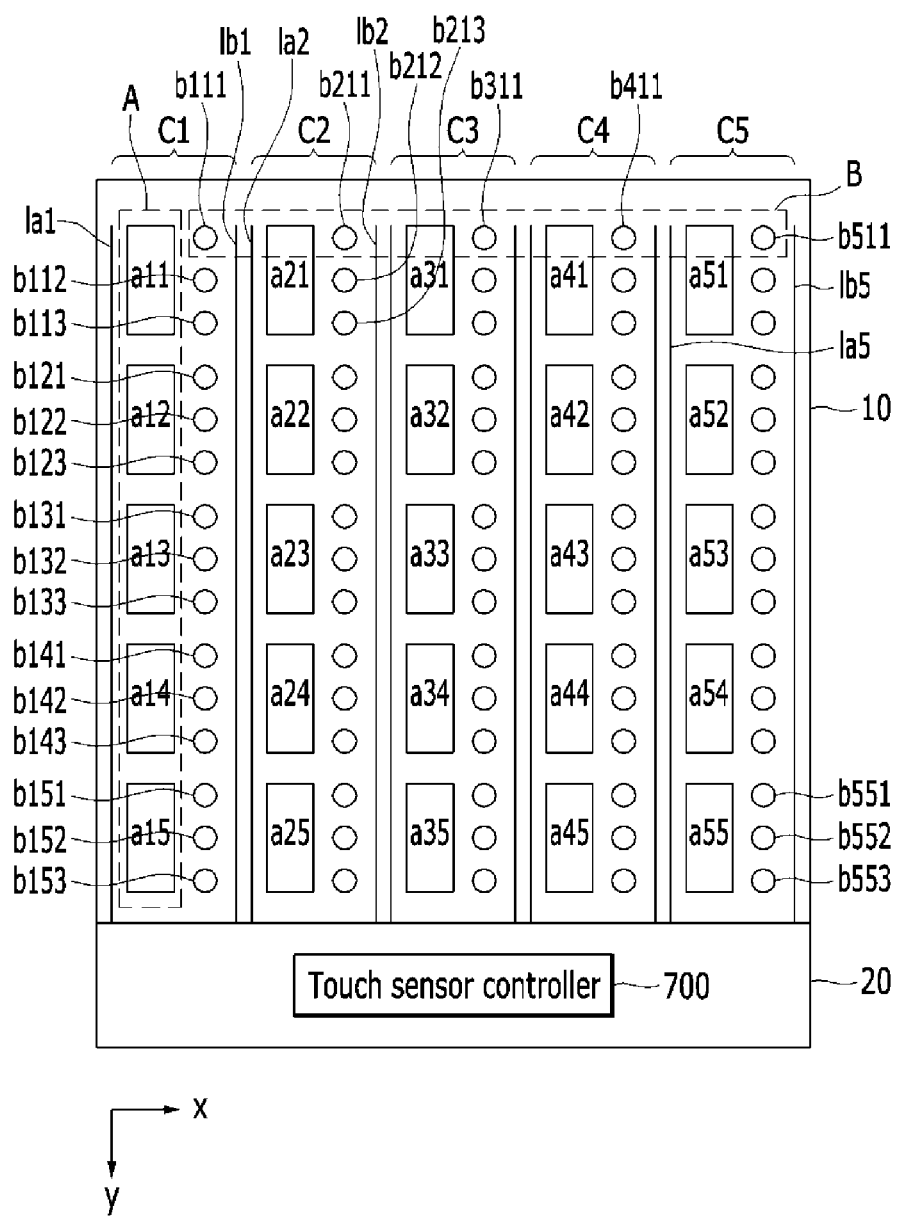
FIG. 1 is a diagram schematically illustrating a touch sensor device according to an exemplary embodiment.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be described in detail with reference to the accompanying drawings.

FIG. 1 is a diagram schematically illustrating a touch sensor device according to an exemplary embodiment.

Referring to FIG. 1, a touch sensor device includes a touch panel 10 and a touch sensor circuit 20.

The touch panel 10 includes a plurality of electrode patterns A and B forming a touch sensor which detects a contact of an external object, such as a hand or a stylus. The electrode patterns A and B may be formed on an outer surface of a substrate of the display panel, which displays an image, in an on-cell type. However, exemplary embodiments are not limited thereto. For example, the electrode patterns A and B may be formed in an in-cell type inside the display panel or the electrode patterns A and B may be formed on a separate substrate formed of a transparent insulator, such as glass and plastic, and attached onto the display panel.

The first electrode patterns A and the second electrode patterns B may be physically and electrically separated. The first electrode patterns A and the second electrode patterns B may be formed on the same layer, and within a touch area of the touch panel 10. Here, the touch area refers to an area in which it is possible to detect a non-contact touch including hovering in a state where an object is close to or approaches the touch panel 10, as well as a contact touch that is a direct contact of an object to the touch panel 10. The touch area may overlap or approximately correspond to a display area in which an image is actually displayed in the display panel.

The first electrode patterns A are arranged in a substantially horizontal direction, and each first electrode pattern A includes a plurality of first electrode cells (a11, a12, . . . , a21, a22, . . . ) arranged in a substantially vertical direction. The second electrode patterns B are arranged in a substantially vertical direction, and each second electrode pattern B includes a plurality of second electrode cells (b111, b211, . . . , b112, b212, . . . ) arranged in a substantially horizontal direction.

The first electrode cells (a11, . . . ) are arranged in a matrix, and the second electrode cells (b111, . . . ) are also arranged in the matrix. The second electrode cells b111, b112, b113 are positioned between the first electrode cells a11 and a21 which are adjacent in the horizontal direction, and the first electrode cell a21 is positioned between the second electrode cells b111 and b211 which are adjacent in the horizontal direction. That is, one first electrode cell and one second electrode cell are alternately disposed in the horizontal direction. However, this is merely exemplary. For example, each two first electrode cells and each two second electrode cells may be alternately disposed in the horizontal direction. The second electrode cell b111 is not positioned between the first electrode cells a11 and a12 which are adjacent in the vertical direction, and the first electrode cell a11 is not positioned between the second electrode cells b111 and b112 which are adjacent in the vertical direction.

The first electrode cell is illustrated as having a rectangular shape, and the second electrode cell is illustrated as having a circular shape for easily discriminating the first electrode cell and the second electrode cell, but the shapes of the electrode cells are not limited thereto, and may be varied. For example, all of the first electrode cell and the second electrode cell may have a rectangular shape, and may have a protrusion for improving sensitivity of the touch sensor. Further, the first electrode cells may have different sizes according to a position, and the second electrode cells may also have different sizes according to a position.

The first electrode cells a11, a12, . . . of the first electrode patterns A and the second electrode cells b111, b112, b113, b121, b122, b123, . . . adjacent to the first electrode cells a11, a12, . . . of the first electrode patterns A in the horizontal direction form the touch sensor in the mutual capacitive method. A combination of the first electrode cells and the second electrode cells forming the touch sensor in the mutual capacitive method is indicated by columns C1, C2, . . . in the drawing, and the number of columns corresponds to the number of first electrode patterns A or the number of second electrode cells included in one second electrode pattern B.

Each column may include channels corresponding to the number of second electrode cells. Here, the channel refers to a unit of a position combination discriminable in generating position information by the mutual capacitive method. In each column, one first electrode cell (a11; a12; . . . ) may correspond to the plurality of second electrode cells (b111, b112, and b113; b121, b122, and b123; . . . ). FIG. 1 exemplifies five groups including the first electrode cells and the second electrode cells, which have corresponding relationships, included in each column. FIG. 1 illustrates an example in which one first electrode cell corresponds to three second electrode cells, and in this case, three channels may be generated in one first electrode cell.

In each of the columns C1, C2, . . . , first touch signal lines la1, la2, . . . connected with the first electrode cells a11, a12, . . . , a21, a22, . . . are positioned on a lateral surface of the first electrode cells, and second touch signal lines lb1, lb2, . . . connected with the second electrode cells (b111, b112, and b113; b121, b122, and b123; . . . ) are positioned on a lateral surface of the second electrode cells. The first and second touch signal lines are formed on the same layer as the first and second electrode cells, and are formed within the touch area of the touch panel 10. However, the touch signal lines positioned at a leftmost side and a rightmost side may also be positioned around the touch area. A particular connection of the first and second electrode cells and the first and second touch signal lines will be described with reference to FIG. 2 below.

In order to avoid complexity in the drawing, one touch signal line per one column is illustrated in FIG. 1, but first touch signal lines corresponding to the number of first electrode cells may be used. Only one second touch signal line per one column is also illustrated, but a plurality of second touch signal lines may be used.

The first electrode patterns, the second electrode patterns, the first touch signal lines, and the second touch signal lines may be formed on the same layer as described above, and formed of transparent conductive oxide (TCO), such as indium tin oxide (ITO) and indium zinc oxide (IZO), conductive nanowire, such as silver nanowire (AgNW), a metal mesh, and the like. For example, the first and second electrode patterns and the first and second touch signal lines may be simultaneously formed by stacking indium tin oxide (ITO) on a substrate and pattering the indium tin oxide (ITO).

The first and second touch signal lines (lb1, la2, . . . ) are connected to a touch sensor controller 700 through wires (not illustrated) positioned within the sensor circuit 20. The first and second electrode cells may receive a touch signal, such as a detection input signal, from the touch sensor controller 700 through the first and second touch signal lines, and may transmit a touch signal, such as a detecting output signal, to the touch sensor controller 700. The sensor circuit 20 may be formed around the touch area of the touch panel 10, and may be formed on a separate printed circuit board (PCB), a flexible PCB (FPCB), and/or the like. The touch sensor controller 700 may be positioned inside the sensor circuit 20 or outside the sensor circuit 20 to be connected with the sensor circuit 20 through the FPCB, etc.

A connection of the touch signal lines will be described in detail with reference to FIG. 2 below.

Figure 2:
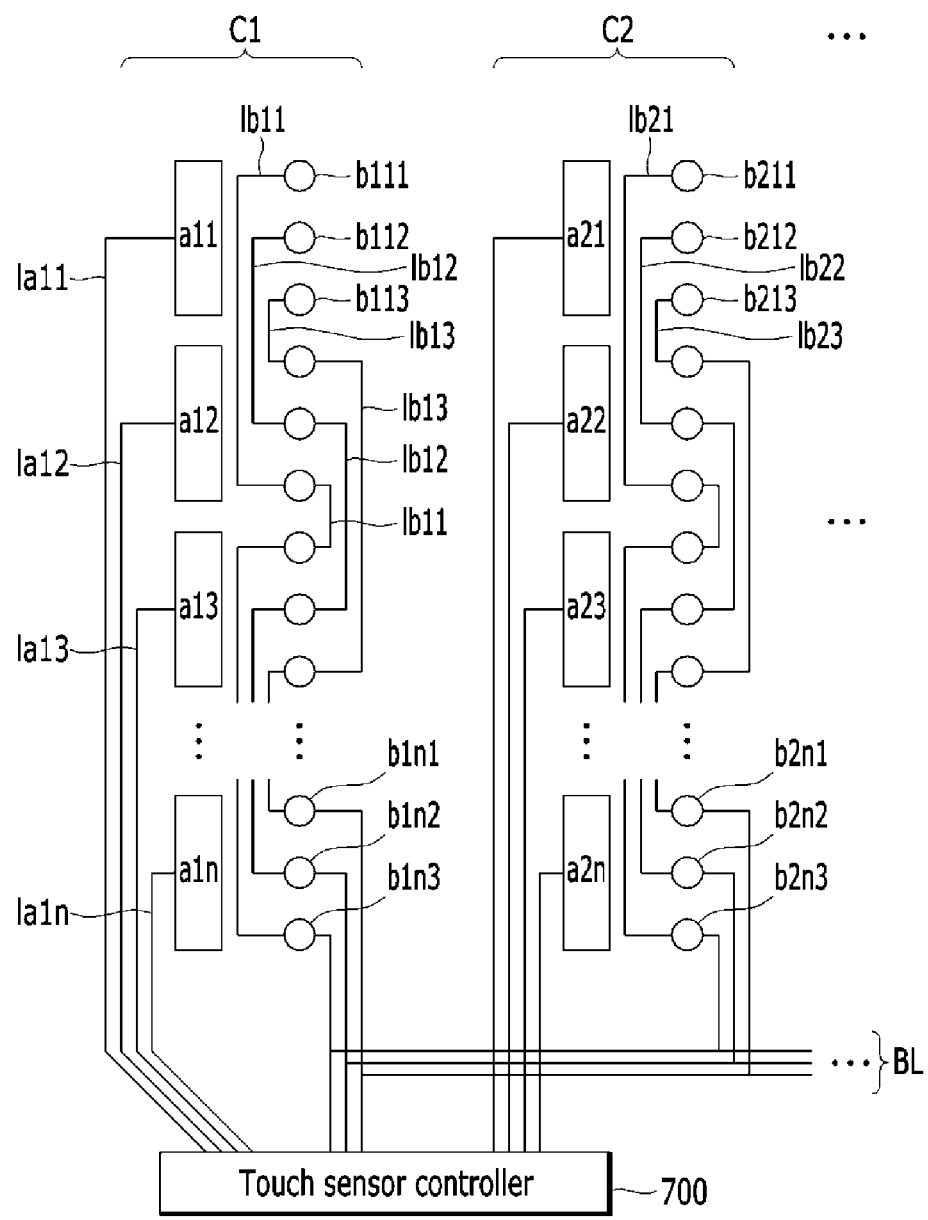
FIG. 2 is a diagram illustrating a part of the touch sensor device according to an exemplary embodiment.

FIG. 2 is a diagram illustrating a part of the touch sensor device according to the exemplary embodiment shown in FIG. 1. Regarding FIG. 2, in order to decrease confusion, some reference numbers are omitted. Structures in FIG. 2 are the same as those shown in FIG. 1, and thus, any structures with omitted reference numbers have reference numbers corresponding with those in FIG. 1.

Referring to FIG. 2, the columns C1, C2, . . . including the first electrode cells, the second electrode cells, and the first touch signal lines and the second touch signal lines connected with the first electrode cells and the second electrode cells, respectively, are illustrated. The touch panel 10 includes the number of columns C1, C2, . . . which have the same pattern in the horizontal direction. The disposition of the first and second electrode patterns A and B is substantially the same as that illustrated in FIG. 1, but FIG. 2 illustrates that N first electrode cells a11, a12, . . . , and a1$n$; a21, a22, . . . , and a2$n$ are disposed in the vertical direction.

The first electrode cells a11, a12, . . . , and a1$n$ of one first electrode pattern A and the second electrode cells b111, b112, . . . , and b1$n$3 of different second electrode patterns B are disposed in the first column C1. Further, in the first column C1, the first touch signal lines la11, la12, . . . , and la1$n$ are connected to the first electrode cells, and the second touch signal lines lb11, lb12, and lb13 are connected to the second electrode cells. The disposition and the connection are equally applied to the second column and the like C2, . . . . That is, in the second column C2, the first electrode cells a21, a22, . . . , and a2$n$ of one first electrode pattern A, the second electrode cells b211, b212, . . . , and b2$n$3 of different second electrode patterns B, the first touch signal lines la21, la22, . . . , and la2$n$, and the second touch signal lines lb21, lb22, and lb23 are disposed, the first touch signal lines are connected to the first electrode cells, and the second touch signal lines are connected to the second electrode cells. Hereinafter, a connection of the touch signal lines will be described based on the first column C1, and the description may be applied to other columns C2, . . . unless particularly mentioned.

The first touch signal lines la11, la12, . . . , and la1$n$ are connected to the first electrode cells a11, a12, . . . , and a1$n$, respectively. Accordingly, the first touch signal lines each correspond to one of the first electrode cells within the first column C1, that is, N first touch signal lines, are present. The first touch signal lines la11, la12, . . . , and la1$n$ may be positioned within the touch area, and substantially extend in a vertical direction. FIG. 2 illustrates that a11 of the first touch signal lines la11, la12, . . . , and la1$n$ extend downwardly, but depending on an exemplary embodiment, the first touch signal lines la11, la12, . . . , and la1$n$ may extend upwardly, or some of the first touch signal lines la11, la12, . . . , and la1$n$ may extend downwardly and some of the first touch signal lines la11, la12, . . . , and la1$n$ extend upwardly.

The first touch signal lines la11, la12, . . . , and la1$n$ may each be separately connected to the touch sensor controller 700 through the sensor circuit 20. Accordingly, the first electrode cells a11, a12, . . . , and a1$n$ may be independently driven, and the touch sensor controller 700 may receive a detection output signal Rx from each of the first electrode cells a11, a12, . . . , and a1$n$. Accordingly, when there is a touch at a plurality of points, that is, a multi-touch, the touch sensor controller 700 may detect the multi-touch by calculating a position (coordinates) of the first electrode cell for detecting a touch of a corresponding point.

N second electrode cells may be disposed adjacent to the first electrode cells, respectively, and FIG. 2 illustrates an exemplary embodiment in which three second electrode cells are disposed. For example, the second electrode cells b111, b112, and b113 of the first group are disposed adjacent to the first of the first electrode cells a11, and the second electrode cells b121, b122, and b123 of the second group are disposed adjacent to the second of the first electrode cells a12. In this manner, the second electrode cells b1$n$1, b1$n$2, and b1$n$3 of an $n^{th}$ group are disposed adjacent to the $n^{th}$ first electrode cell a1$n$.

When each group includes three second electrode cells, three second touch signal lines lb11, lb12, and lb13 are connected to the second electrode cell of each group. However, in contrast to the first electrode cell, the second touch signal lines are not separately connected, and the second electrode cells of the groups adjacent in the vertical direction make pairs and are connected with each other. That is, the first second electrode cell b111 of the first group is connected with the third second electrode cell b123 of the second group through the second touch signal line lb11, and the third second electrode cell b123 of the second group is connected with the first second electrode cell b131 of the third group, and the connection continues up to the third or first second electrode cell b1$n$3 or b1$n$1 of the $n^{th}$ group. The second of the second electrode cells b112 of the second group is connected to the second electrode cells b122 to b1$n$2 of the second to $n^{th}$ groups through the second touch signal line lb12. The third of the second electrode cells b113 of the first group is connected with the first second electrode cell b121 of the second group and the third second electrode cell b133 of the third group through the second touch signal line lb13, and the connection continues up to the first or third second electrode cell b1$n$1 or b1$n$3 of the $n^{th}$ group. As a result, in the first column C1, only three second touch signal lines lb11, lb12, and lb13 are disposed in the touch area, and are connected with the touch sensor controller 700 through the sensor circuit 20.

When each group includes m second electrode cells, m second touch signal lines are disposed and connected. Accordingly, when n first electrode cells are disposed in each column, and m second electrode cells are disposed in each of the first electrode cells, n+m touch signal lines are disposed in each column. Further, n×m channels are formed in each column, and n×m channels have the same number as that of the second electrode cells positioned in each column.

The second electrode cells b111, b123; b112, b122; and b113, b121 are paired up in a closeness order with the adjacent groups and connected so as to prevent the second touch signal lines lb11, lb12, and lb13 from crossing each other and from being short-circuited therebetween, as shown in FIG. 2. Accordingly, when each group includes m second electrode cells, for example, the first, second, third, and $m^{th}$ second electrode cells of the first group are connected with the $m^{th}$, m–1$^{th}$, m–2$^{th}$, and first second electrode cells of the second group, respectively.

In the first column C1, the first electrode cell and the second electrode cell adjacent to the first electrode cell form the mutual capacitive touch sensor. To this end, the second electrode cell may receive a detection input signal Tx through the second touch signal lines lb11, lb12, and lb13, and the first electrode cell may output the detection output signal Rx through the first touch signal lines la11, la12, . . . , and la1$n$. Since the second electrode cells included in the different groups are connected by the second touch signal line, for example, when the detection input signal Tx is input through the second touch signal line lb11, the detection input signal Tx is simultaneously input to the second electrode cells b111, b123, b131, . . . of each group. However, n first electrode cells, which are paired up with the second electrode cells of each group, are disposed, and the first touch signal line is individually connected to each first electrode cell, so that it is possible to detect a touch position and also detect a multi-touch by specifying the first electrode cell, which outputs the detection output signal Rx having a change due to a touch, and the second electrode cell, which is paired up with the first electrode cell.

The disposition and the connection relationship of the first and second electrode cells within the second column C2 and the first and second touch signal lines are the same as those of the aforementioned first column C1. However, in the relationship with the first column C1, the second touch signal lines lb21, lb22, and lb23 within the second column C2 may be connected with the second touch signal lines lb11, lb12, and lb13 within the first column C1 through three bus lines BL (however, m bus lines may be used when the number of second touch signal lines is m), within the sensor circuit 20 respectively. Although not illustrated, the same applies to the second touch signal lines within additional columns. Accordingly, the second electrode cells b111, b211, . . . ; b112, b212, . . . ; . . . positioned on the same row are electrically connected to form one second electrode pattern B. Accordingly, when the detection input signal Tx is applied to any one second touch signal line, the detection input signal Tx is input into all of the second electrode cells connected to the corresponding second touch signal line. That is, when the detection input signal Tx is input into any one second electrode cell of a specific second electrode pattern B, the detection input signal Tx is also input into all of the other second electrode cells of the corresponding second electrode pattern B.

A ghost may be generated at a position that is irrelevant to the touch point, in the touch panel 10 configured as described above. Hereinafter, a reason of the generation of a ghost in the aforementioned touch panel 10 will be described with reference to FIG. 3. Further, a method capable of removing a ghost will be described.

Figure 3:
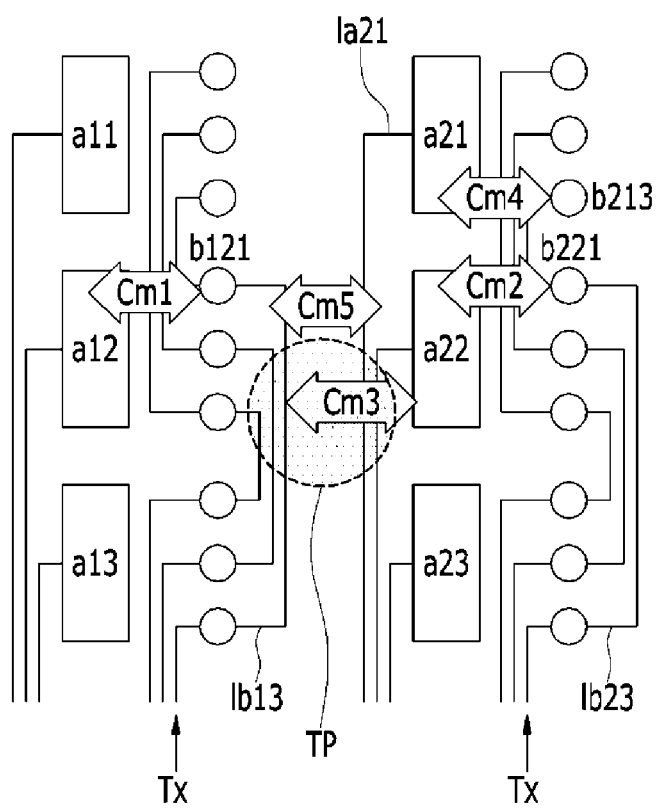
FIG. 3 is a diagram describing the generation of a ghost in a touch panel according to the exemplary embodiment.

FIG. 3 is a diagram for describing the generation of a ghost in the touch panel according to the exemplary embodiment. For description, FIG. 3 illustrates three first electrode cells a11, a12, and a13 of the first column C1, three first electrode cells a21, a22, and a23 of the second column C2, and the second electrode cells grouped with each of the first electrode cells.

Referring to FIG. 3, the generation of a ghost in the touch panel will be described based on an exemplary embodiment in which when the detection input signal Tx is applied to the second touch signal line lb13 of the first column C1 and the second touch signal line lb23 of the second column C2 connected with the second touch signal line lb13 of the first column C1 through the sensor circuit 20, a touch point TP exists between the second electrode cell included in the second group in the first column C1 and the first electrode cell a22 included in the second group in the second column C2.

The first electrode cell a12 of the first column C1 adjacent to the touch point TP outputs the detection output signal Rx corresponding mutual capacitance Cm1 between the first electrode cell a12 and the second electrode cell b121 included in one group.

By contrast, the first electrode cell a22 of the second column C2 adjacent to the touch point TP outputs the detection output signal Rx corresponding to second mutual capacitance Cm3 between the second touch signal line lb13 of the first column C1 and the first electrode cell a22 of the second column C2, as well as the first mutual capacitance Cm2 between the first electrode cell a22 and the second electrode cell b221 included in one group. That is, the first mutual capacitance Cm2 is changed by the second mutual capacitance Cm3, and a ghost by the second mutual capacitance Cm3 is included in the detection output signal Rx.

Further, the first electrode cell a21 disposed at an upper end of the first electrode cell a22 of the second column C2 adjacent to the touch point TP outputs the detection output signal Rx corresponding to fourth mutual capacitance Cm5 between the second touch signal line lb13 of the first column C1 and the first touch signal line la21 of the second column C2, as well as third mutual capacitance Cm4 between the first electrode cell a21 and the second electrode cell b213 included in one group. That is, the third mutual capacitance Cm4 is changed by the fourth mutual capacitance Cm5, and a ghost by the fourth mutual capacitance Cm5 is included in the detection output signal Rx.

A touch position needs to be measured by the mutual capacitance between the first electrode cell and the second electrode cell, and as exemplified above, a ghost may be generated by the mutual capacitance between the second touch signal line and the first electrode cell, the mutual capacitance between the second touch signal line and the first touch signal line, or the like. The ghost is characterized by being generated in a direction of the upper end of the touch panel 10 from the touch point TP according to a structure of the touch panel 10.

In order to remove the ghost, touch data for all of the channels may be measured by positioning a touch point TP at each channel of the touch panel 10, and a ratio of a ghost included in the touch data may be measured for each touch position. The ratio of the ghost may be calculated by interpreting a variation amount of mutual capacitance for each channel included in the touch data according to the touch position. The ratios of the ghost for each touch position may be configured as a ghost table. The ghost table may be experimentally measured in the actual touch panel 10, and also be calculated through a simulation with software.

An example of the ghost table will be described with reference to FIGS. 4 to 6. It is assumed that the touch panel 10 includes k columns, and each column includes n channels in FIGS. 4 to 6.

FIG. 4 is a diagram illustrating an example of a ghost table for removing a ghost.

Referring to FIG. 4, the ghost table may be configured to include a ghost ratio for each channel for touch positions CH1 to CHn for each column. For example, a ghost ratio for each channel for a touch position may be measured and stored, up to a channel n CHn, by a method of measuring and storing a ghost ratio GR1_1 to GRn_1 in each of a channel 1 to the channel n CH1 to CHn when a touch position in the first column is the channel 1 CH1, and measuring and storing a ghost ratio GR1_1 to GRn_1 in each of the channel 1 to channel n CH1 to CHn when the touch position is a channel 2 CH2. Accordingly, a ghost table for the first column may be created. Ghost tables for second to $k^{th}$ columns may be created by the same method.

Here, it is exemplified that k ghost tables are created for the first to $k^{th}$ columns, respectively, but one ghost table may be created by combining the ghost tables of the first to $k^{th}$ columns.

As described above, the created ghost table may be stored in the touch sensor controller 700. The touch sensor controller 700 may remove the ghost from the measured touch data by using the ghost table, and generate final touch data, in which the ghost is removed. This will be described in detail with reference to FIG. 7.

FIG. 5 is a diagram illustrating another example of a ghost table for removing a ghost.

Referring to FIG. 5, when a ghost table is configured with a ghost ratio for each channel for a touch position for each column similar to FIG. 4, the number of ghost ratios to be stored is n×n×k. Accordingly, a capacity of a memory used for the data stored in the touch sensor controller 700 increases.

As illustrated in FIG. 5, a representative ghost ratio GRA, at which ghosts for the touch positions CH1 to CHn for each column are removable, may be created. The representative ghost ratio GRA may be an average value of the ghost ratios for each channel for the touch position. For example, a representative ghost ratio GR1 for the channel 1 for the touch position may be generated by averaging the ghost ratios GR1_1 to GRn_1 in the channel 1 to the channel n CH1 to CHn when the touch position in the first column is the channel 1 CH1. Representative ghost ratios GR2 to GRn for the channel 2 CH2 to the channel n CHn for the touch position in the first column may be generated by the same method. Accordingly, the ghost table for the first column may be created, and the ghost tables for the second to $k^{th}$ columns may be created by the same method.

FIG. 6 is a diagram illustrating yet another example of a ghost table for removing a ghost.

Referring to FIG. 6, two representative ghost ratios GRA1 and GRA2 may be generated for touch positions CH1 to CHn for each column. The first representative ghost ratio GRA1 may be an average value of the ghost ratios, which are equal to or greater than an average ghost ratio that is an average of ghost ratios for each channel for the touch position, and the second representative ghost ratio GRA2 may be an average value of ghost ratios smaller than the average ghost ratio. The ghost table including the two representative ghost ratios GRA1 and GRA2 for the touch position may be created for each of the k columns.

The ghost table may be used by a method of applying the first representative ghost ratio GRA1 to the channels CH, of which the ghost ratios are larger than the average, and applying the second representative ghost ratio GRA2 to the channels, of which the ghost ratios are smaller than the average, according to the touch position.

As illustrated in FIGS. 5 and 6, when the representative ghost ratio is used, the ghost is not completely removed in the measured touch data, but the ghost is mostly removable, and some remaining ghosts have an ignorable noise level compared to the touch data, so that it is possible to effectively remove the ghost while decreasing a capacity of the memory for the ghost table.

Now, a method of removing a ghost from measured touch data by using the ghost table will be described with reference to FIGS. 7 to 10.

Figure 7:
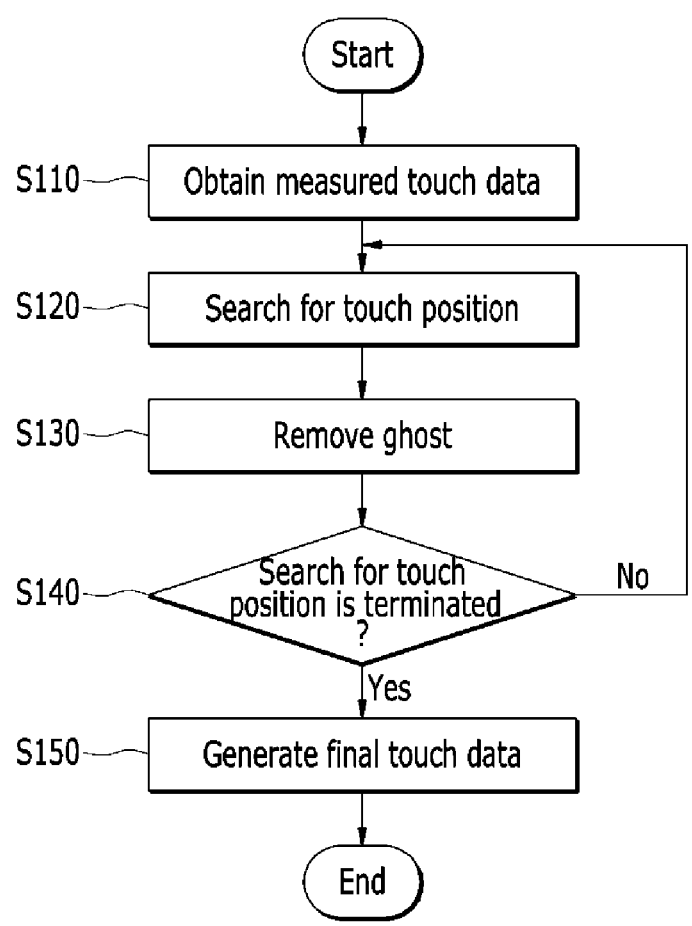
FIG. 7 is a flowchart illustrating a method of removing a ghost according to an exemplary embodiment.
Figure 8:
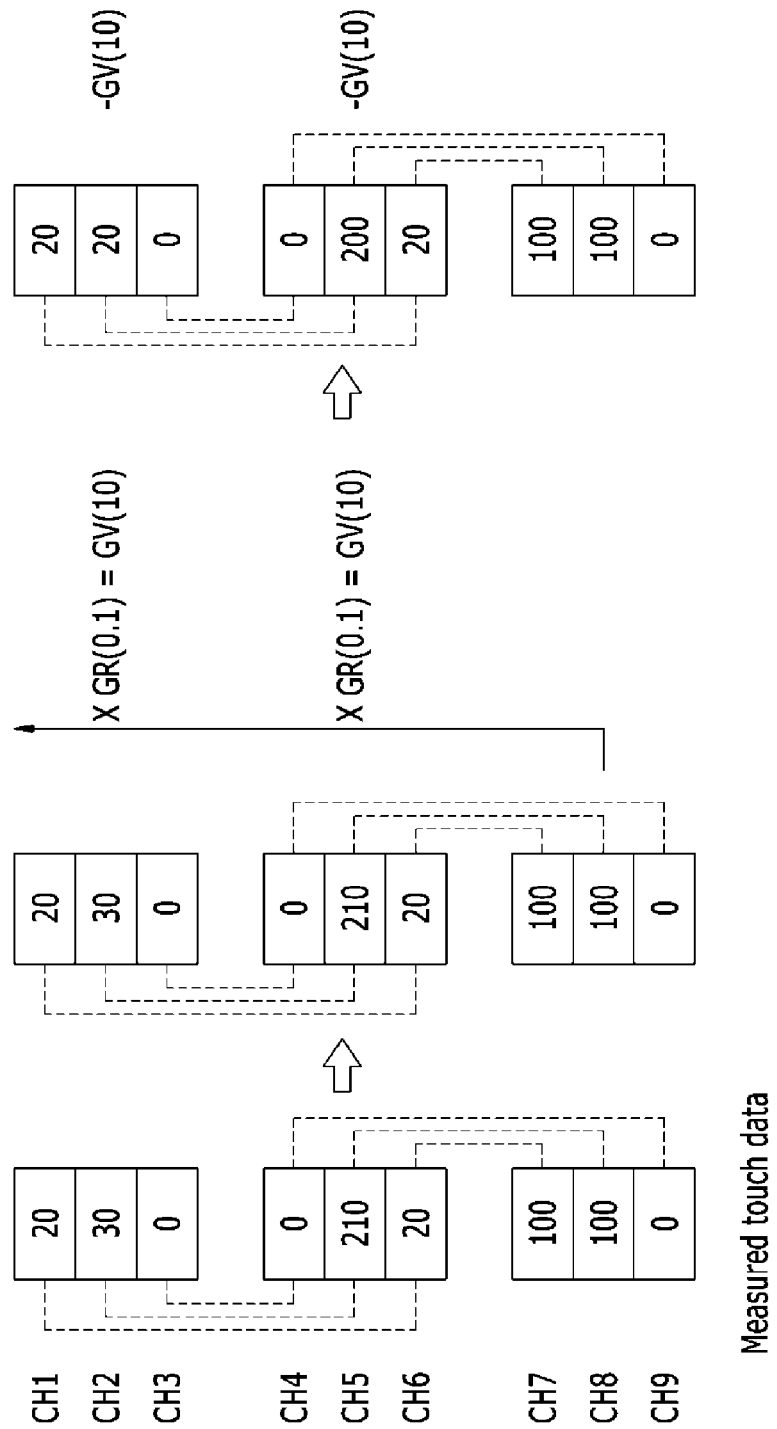
FIGS. 8, 9, and 10 are diagrams illustrating a process of removing a ghost according to an exemplary embodiment.
Figure 9:
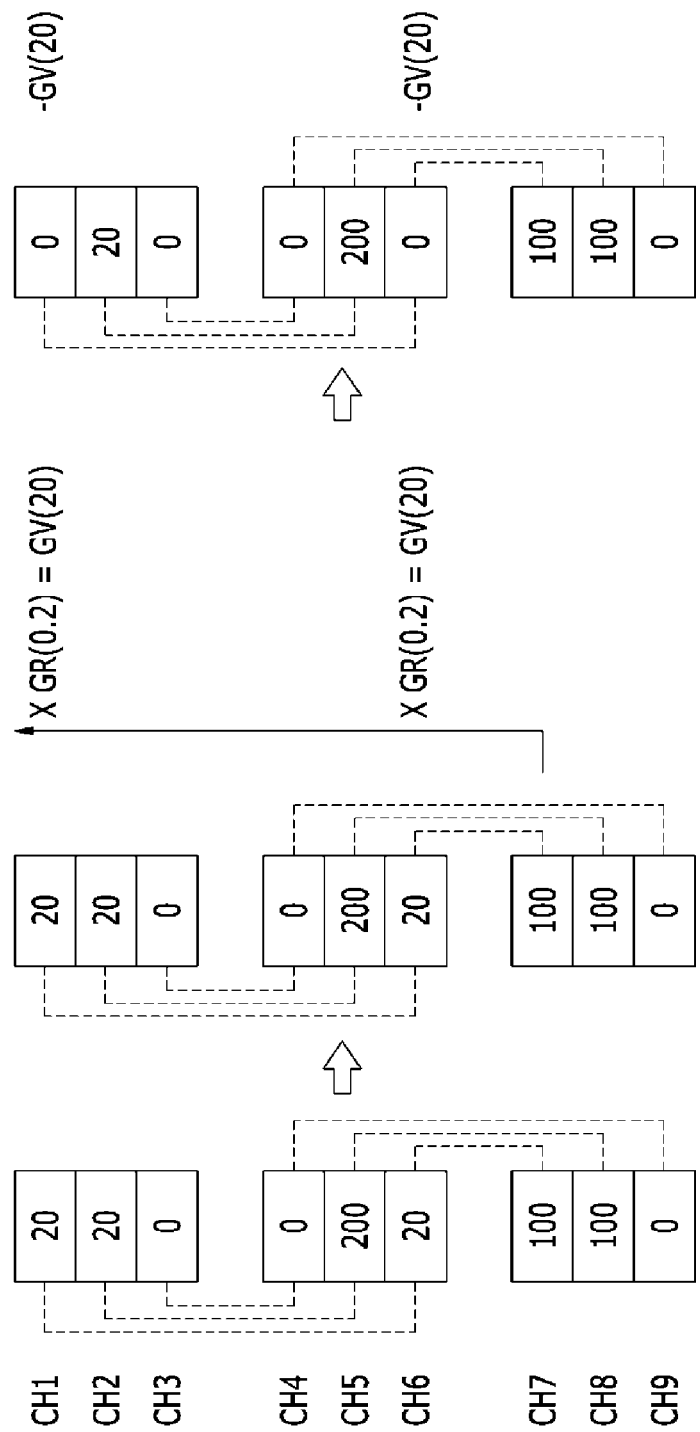
Figure 10:
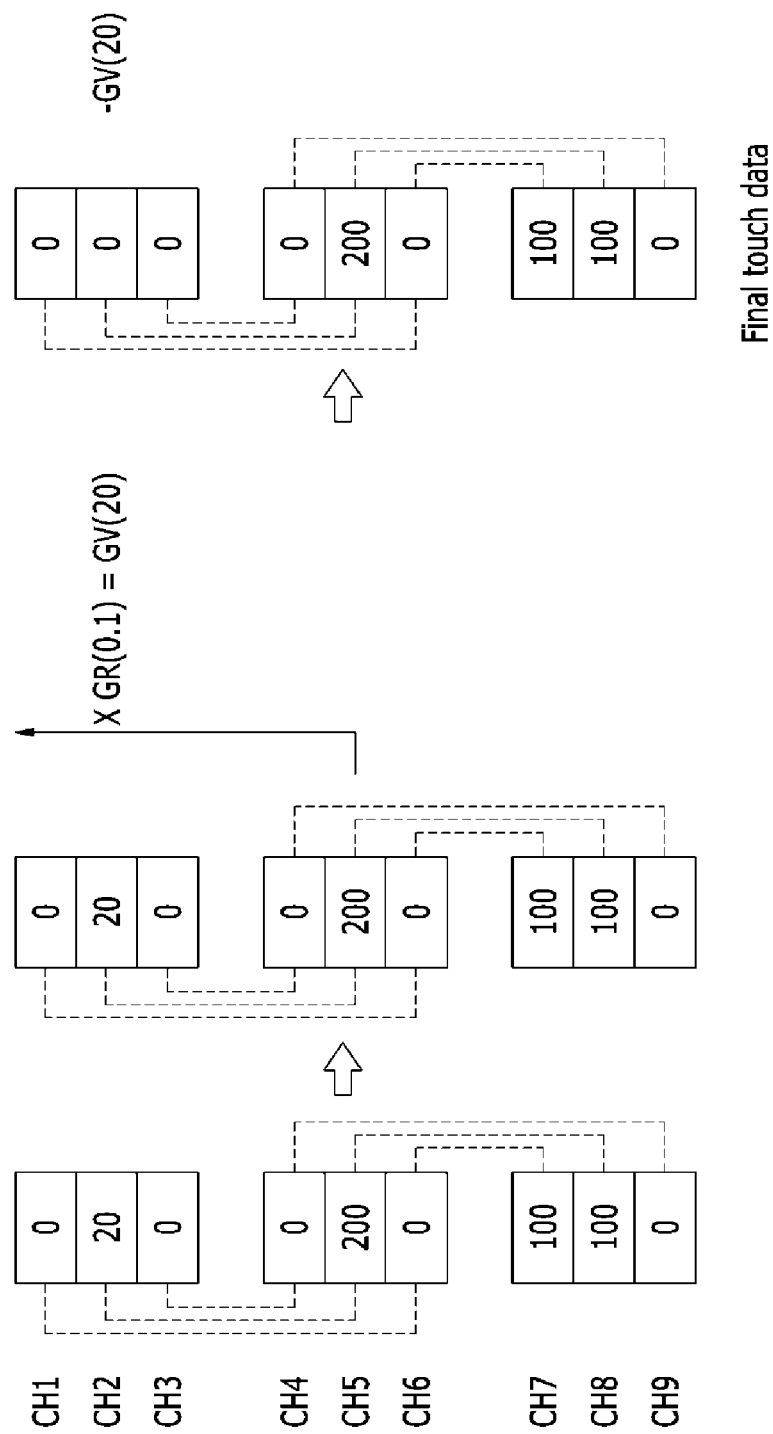

FIG. 7 is a flowchart illustrating a method of removing a ghost according to an exemplary embodiment. FIGS. 8 to 10 are diagrams illustrating a process of removing a ghost according to an exemplary embodiment. In FIGS. 8 to 10, a dotted line represents connections between the second electrode cells by the second touch signal line, and nine channels CH1 to CH9 of three groups included in one column are exemplified.

Referring to FIGS. 7 to 10, the touch sensor controller 700 obtains measured touch data for all of the channels by a method of applying a detection input signal Tx to the second touch signal lines, and receiving a detecting output signal Rx from the first touch signal lines (S110). The measured touch data may include a variation amount in mutual capacitance of each channel. Here, the variation amount in mutual capacitance of each channel is referred to as a channel value for description purposes. Further, a channel value of each channel is illustrated by a predetermined value, although exemplary embodiments are not limited thereto.

The touch sensor controller 700 confirms a channel value of each channel from the measured touch data and searches for a touch position (S120). In this case, a touch position is sequentially searched from a channel positioned at a side close to the touch sensor controller 700 to a channel positioned at a side far from the touch sensor controller 700. As exemplified in FIG. 2, since the touch sensor controller 700 is positioned at a lower side of the touch panel 10, the touch sensor controller 700 searches for a touch position from the lower side to an upper side of the touch panel 10.

Referring to FIG. 8, a channel value of each channel is sequentially searched from the channel 9 CH9 in the direction of the channel 1 CH1. Since a channel value of the channel 8 CH8 is 100, the channel 8 CH8 may be detected as the touch position. When the touch position is detected, the channel having a channel value equal to or larger than a predetermined threshold value may be detected as the touch position.

Referring back to FIG. 7, when the touch position is detected, the touch sensor controller 700 confirms a ghost ratio for each channel for the touch position in the ghost table, calculates a ghost value by multiplying the channel value of the touch position by the ghost ratio for each channel, and removes the ghost by subtracting the ghost value from the channel value of each channel (S130).

Referring to FIG. 8, the channel value of the channel 8 CH8 is 100, and a ghost ratio GR of each of the channel 5 CH5 and the channel 2 CH2 connected to the channel 8 CH8 is 0.1. When the channel value of 100 of the channel 8 CH8 is multiplied by the ghost ratio GR of 0.1, the ghost value GV is calculated as 10. When the ghost value GV of 10 is subtracted from the channel value of 210 of the channel 5 CH5, a channel value of the channel 5 CH5 is 200. When the ghost value GV of 10 is subtracted from the channel value of 30 of the channel 2 CH2, a channel value of the channel 2 CH2 is 20.

Referring back to FIG. 7, the touch sensor controller 700 removes the ghost for the detected touch position, and then determines whether the search of the touch position is terminated (S140). The search of the touch position is performed up to the last channel at the upper side from the lower side of the touch panel 10. When the search of the touch position is not performed to the last channel, the touch position is searched in a next channel.

Referring to FIG. 9, after the touch position is searched and the ghost is removed for the channel 8 CH8, the touch position for the channel 7 CH7 is searched. Since the channel value of the channel 7 CH7 is 100, the channel 7 CH7 is detected as the touch position. A ghost ratio GR of each of the channel 6 CH6 and the channel 1 CH1 connected to the channel 7 CH7 is 0.2. When the channel value of 100 of the channel 7 CH7 is multiplied by the ghost ratio GR of 0.2, the ghost value GV is calculated as 20. When the ghost value GV of 20 is subtracted from the channel value of 20 of the channel 6 CH6, a channel value of the channel 6 CH6 is 0. Further, when the ghost value GV of 20 is subtracted from the channel value of 20 of the channel 1 CH1, a channel value of the channel 1 CH1 is 0.

Referring to FIG. 10, after the touch position is searched and the ghost is removed for the channel 7 CH7, the touch position for the channel 6 CH6 is searched. Since the channel value of the channel 6 CH6 is 0, the channel 6 CH6 is not detected as the touch position. Next, the touch position for the channel 5 CH5 is searched. Since the channel value of the channel 5 CH5 is 200, the channel 5 CH5 is detected as the touch position. A ghost ratio GR of the channel 2 CH2 connected to the upper side of the channel 5 CH5 is 0.1. When the channel value of 200 of the channel 5 CH5 is multiplied by the ghost ratio GR of 0.1, the ghost value GV is calculated as 20. When the ghost value GV of 20 is subtracted from the channel value of 20 of the channel 2 CH2, a channel value of the channel 2 CH2 is 0. Since the ghost is generated upwardly at the touch position, the ghost is removed in the up direction of the touch panel 10.

After the touch position is searched and the ghost is removed for the channel 5 CH5, the touch position is sequentially searched on the channel 4 CH4, the channel 3 CH3, the channel 2 CH2, and the channel 1 CH, and the channel value of each channel is 0 (the value lower than the threshold value), so that the ghost is not removed.

When the search for the touch position for the channel 1 CH1, that is, the last channel, is terminated, the channel value left in each channel becomes final touch data from which the ghost is removed. One channel 5 CH5 and one of the channels 7 and 8 CH7 and CH8 in the final touch data may be detected as the touch positions.

Referring back to FIG. 7, when the search of the touch position is terminated, the touch sensor controller 700 generates final touch data configured with the remaining channel value (S150).

In the process shown in FIGS. 8 to 10, the touch sensor controller 700 searches for the touch position from the lower side to the upper side of the touch panel 10 has been described with reference to FIGS. 7 to 10. By contrast, the touch sensor controller 700 may also search for the touch position from the upper side to the lower side of the touch panel 10 and remove the ghost. This will be described with reference to FIGS. 11 to 13.

Figure 11:
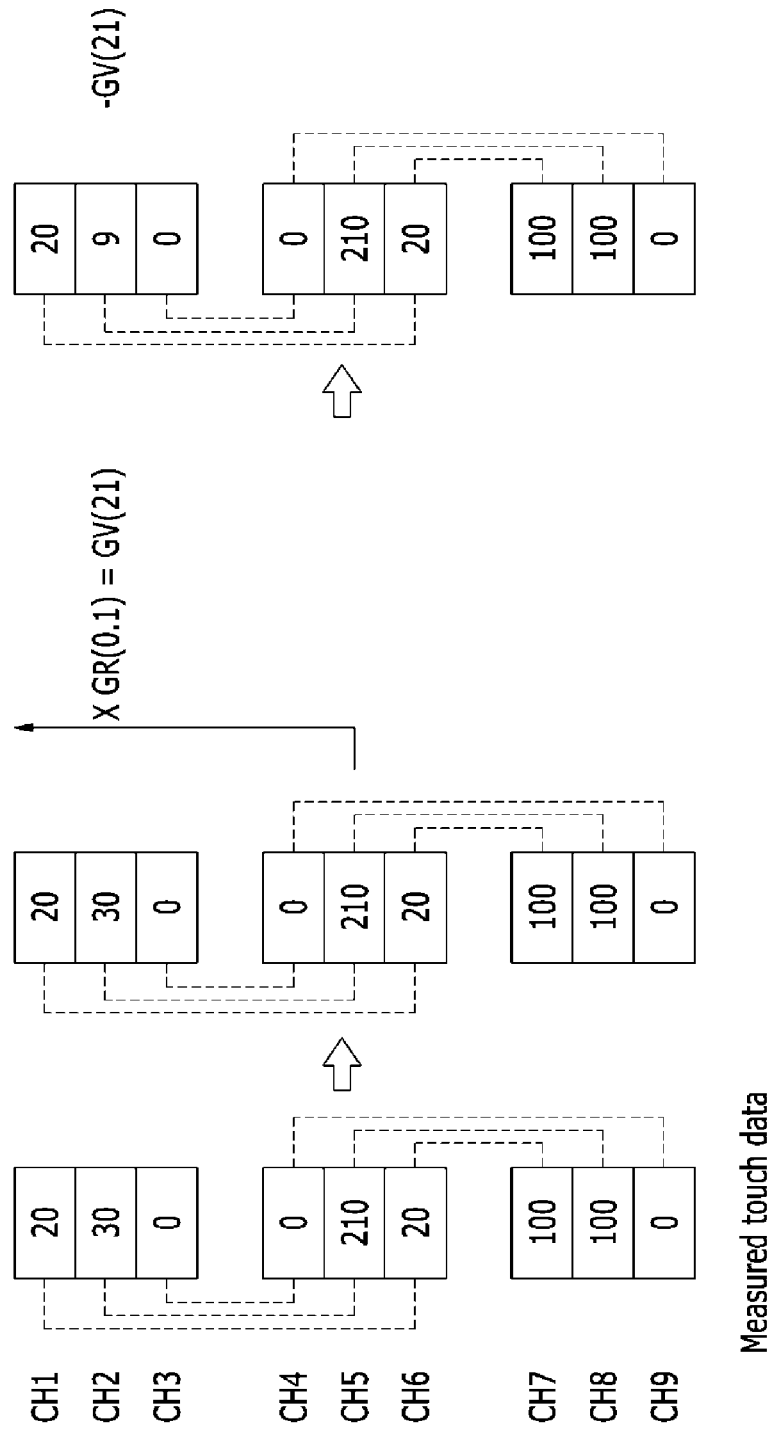
FIGS. 11, 12, and 13 are diagrams illustrating a process of removing a ghost according to another exemplary embodiment.
Figure 12:
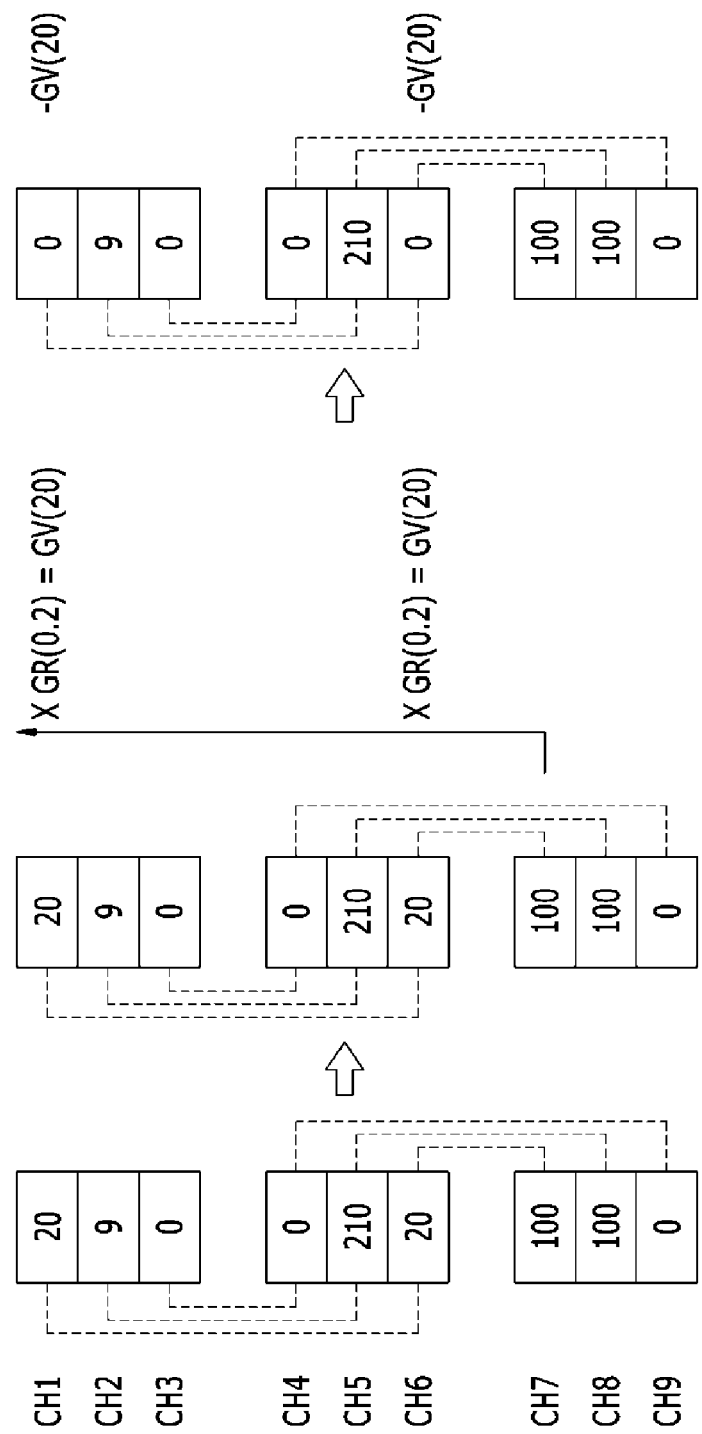
Figure 13:
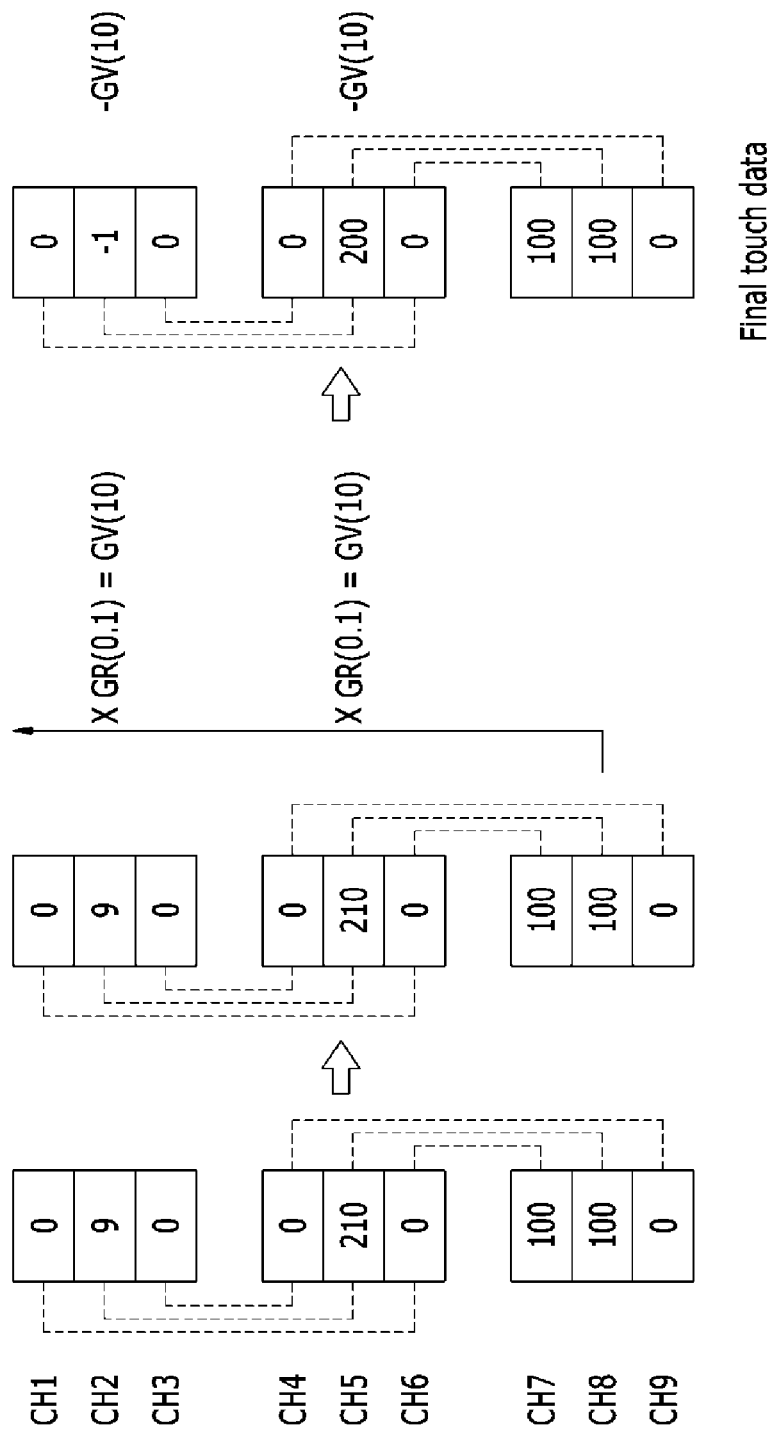

FIGS. 11 to 13 are diagrams illustrating a process of removing a ghost according to another exemplary embodiment.

Referring to FIG. 11, a channel value of each channel is sequentially searched for in a direction from the channel 1 CH1 to the channel 9 CH9. When a threshold value for detecting a touch position is about 40, even though the channel value of the channel 1 CH1 is 20, and the channel value of the channel 2 CH2 is 30, the channel values of the channel 1 CH2 and the channel 2 CH2 are smaller than the threshold value, so that the channel 1 CH1 and the channel 2 CH2 are not detected as touch positions. Since a channel value of the channel 5 CH5 is 210, the channel 5 CH5 may be detected as the touch position.

The channel value of the channel 5 CH5 is 210, and a ghost ratio GR of the channel 2 CH2 connected to the upper side of the channel 5 CH5 is 0.1. When the channel value of 210 of the channel 5 CH5 is multiplied by the ghost ratio GR of 0.1, the ghost value GV is calculated as 21. When the ghost value GV of 21 is subtracted from the channel value of 30 of the channel 2 CH2, a channel value of the channel 2 CH2 is 9.

Referring to FIG. 12, after the touch position is searched and the ghost is removed for the channel 5 CH5, the touch position for the channel 6 CH6 is searched. A channel value of the channel 6 CH6 is smaller than the threshold value, so that the channel 6 CH6 is not detected as the touch position, and a channel value of the channel 7 CH7 is 100, so that the channel 7 CH7 is detected as the touch position. A ghost ratio GR of each of the channel 6 CH6 and the channel 1 CH1 connected to the channel 7 CH7 is 0.2. When the channel value of 100 of the channel 7 CH7 is multiplied by the ghost ratio GR of 0.2, the ghost value GV is calculated as 20. When the ghost value GV of 20 is subtracted from the channel value of 20 of the channel 6 CH6, a channel value of the channel 6 CH6 is 0. Further, when the ghost value GV of 20 is subtracted from the channel value of 20 of the channel 1 CH1, a channel value of the channel 1 CH1 is 0.

Referring to FIG. 13, after the touch position is searched and the ghost is removed for the channel 7 CH7, the touch position for the channel 8 CH8 is searched. Since the channel value of the channel 8 CH8 is 100, the channel 8 CH8 is detected as the touch position. A ghost ratio GR of each of the channel 5 CH5 and the channel 2 CH2 connected to the channel 8 CH8 is 0.1. When the channel value of 100 of the channel 8 CH8 is multiplied by the ghost ratio GR of 0.1, the ghost value GV is calculated as 10. When the ghost value GV of 10 is subtracted from the channel value of 210 of the channel 5 CH5, a channel value of the channel 5 CH5 is 200. When the ghost value GV of 10 is subtracted from the channel value of 9 of the channel 2 CH2, a channel value of the channel 2 CH2 is −1.

The search for the touch position for the channel 9 CH9 is terminated, and final touch data is generated with a final channel left for each channel. The channel value of the channel 2 CH2 in the final touch data is −1, which is, however, a level ignorable as noise, and one channel 5 CH5 and one of the channels 7 and 8 CH7 and CH8 may be detected as the touch position.

Figure 14:
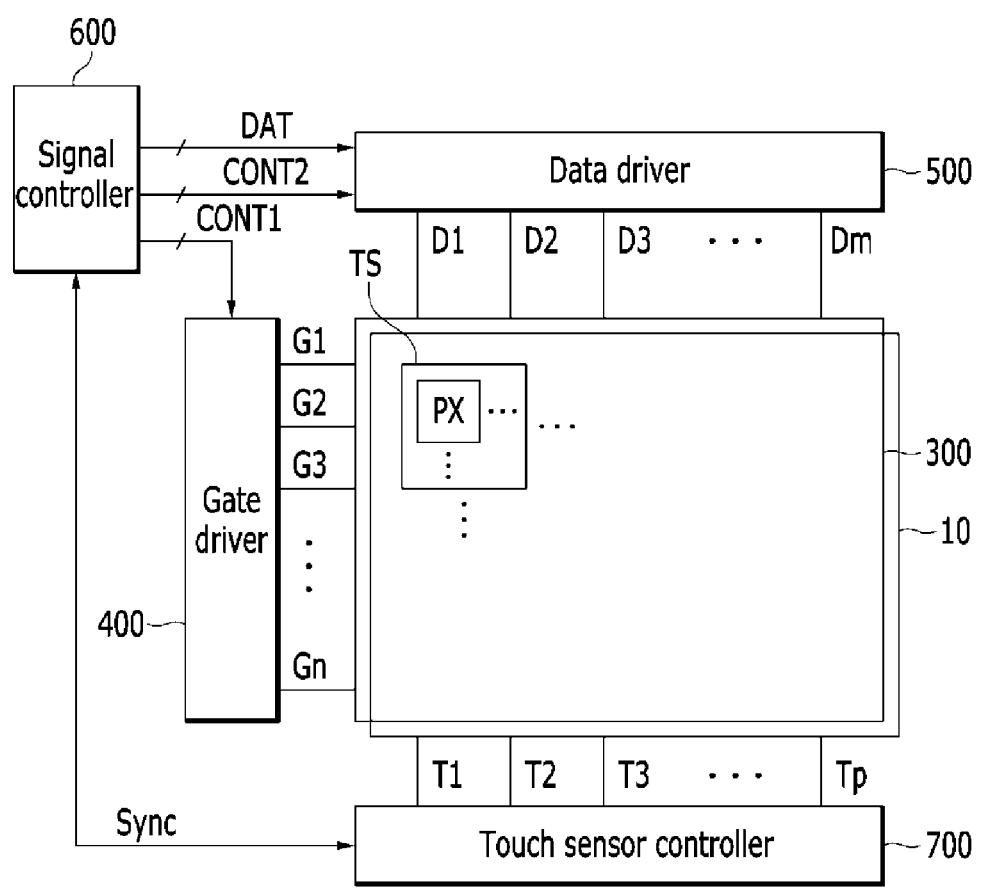
FIG. 14 is a diagram illustrating a display device including a touch sensor device according to an exemplary embodiment.

FIG. 14 is a diagram illustrating a display device including a touch sensor device according to an exemplary embodiment.

Referring to FIG. 14, a display device includes a display panel 300, a gate driver 400 and a data driver 500 connected to the display panel 300, and a signal controller 600 for controlling the gate driver 400 and the data driver 500. Further, the display device includes the touch panel 10 and the touch sensor controller 700 for controlling the touch panel 10. The touch panel 10 may be formed or attached onto an outer surface of the display panel 300, or may be formed inside the display panel 300.

The display panel 300 includes a plurality of gate lines G1 to Gn, a plurality of data lines D1 to Dm, and a plurality of pixels PX connected thereto and approximately arranged in a matrix form. The touch panel 10 includes a plurality of touch signal lines T1 to Tp, and a plurality of touch sensors TS connected to the plurality of touch signal lines T1 to Tp and approximately arranged in the matrix form. The touch sensor TS is implemented by the aforementioned first and second electrode patterns A and B.

The gate lines G1 to Gn extend in an approximately horizontal direction, and transmit a gate signal formed of a combination of a gate-on voltage, which may be capable of turning on a switching element, such as a thin film transistor (TFT), connected to each pixel PX, and a gate-off voltage, which may be capable of turning off a switching element, such as a thin film transistor (TFT), connected to each pixel PX. The data lines D1 to Dm extend in an approximately vertical direction, and may transmit a data voltage to each pixel PX.

The pixel PX may be a unit for displaying an image, and a single pixel may uniquely display one of the primary colors. A plurality of pixels may alternately display the primary colors, thereby displaying a desired color by a spatial or temporal sum of the primary colors. A common voltage and the data voltage may be applied to each pixel PX.

The touch signal lines T1 to Tp extend in an approximately vertical direction, and are connected to the touch sensor TS to transmit a detection input signal Tx and a detection output signal Rx.

The touch sensor TS may generate the detection output signal according to a touch using the mutual capacitive method. The touch sensor Ts may receive the detection input signal from the touch signal lines T1 to Tp, and output a capacitance change by a touch of an external object, such as a finger or a stylus, as the detection output signal through the touch signal lines T1 to Tp.

The signal controller 600 may receive input image signals S, G, and B and a control signal from an external graphic controller (not illustrated). The control signal may include a horizontal synchronization signal Hsyn, a vertical synchronization signal Vsync, a clock signal CLK, a data enable signal DE, and/or the like. The signal controller 600 may process the image signals R, G, and B based on the image signals R, G, and B and the control signal under an operation condition of the display panel 300, and then may generate image data DAT, a gate control signal CON1, and a data control signal CONT2. The signal controller 600 may output the synchronization signal Sync to the touch sensor controller 700, and may receive touch information from the touch sensor controller 700.

The gate control signal CONT1 may include a start pulse vertical signal STV instructing a start of the gate signal, and a clock pulse vertical signal CPV that is a reference for generating the gate-on voltage. An output cycle of the start pulse vertical signal STV may correspond to one frame length (or a refresh rate). The gate control signal CONT1 may further include an output enable signal OE that limits a maintaining time of the gate-on voltage.

The data control signal CONT2 may include a start pulse horizontal signal STH instructing a start of transmission of image data DAT for a pixel of one column, a load signal TP instructing application of a corresponding data voltage to the data lines D1 to Dm, and the like. When the display panel 300 is a liquid crystal display panel, the data control signal CONT2 may further include a reverse signal RVS for reversing a polarity of the data voltage for the common voltage.

The gate driver 400 may apply a gate signal, which is a gate-on voltage, and a gate-off voltage, to the gate lines G1 to Gn according to the gate control signal CONT1.

The data driver 500 may receive the data control signal CONT2 and the image data DAT from the signal controller 600, and may convert the image data DAT into the data voltage using a gray voltage generated by a gray voltage generator (not illustrated) and applies the converted image data DAT to the data lines D1 to Dm.

The touch sensor controller 700 may transmit the detection input signal Tx to the touch sensor TS, and may receive the detection output signal Rx from the touch sensor TS to generate touch information.

According to the exemplary embodiments of the present invention, it is possible to remove ghost data by a touch sensor device of a single layer to improve touch sensitivity.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A touch sensor device, comprising:
a plurality of columns, each column extending in a first direction and comprising:
first electrode patterns comprising physically separated first electrodes;
second electrode patterns comprising physically separated second electrodes;
first touch signal lines electrically connected to the first electrodes;
second touch signal lines electrically connected to the second electrodes; and
a touch sensor controller electrically connected with the first touch signal lines and the second touch signal lines,
wherein:
the first electrode patterns, the second electrode patterns, the first touch signal lines, and the second touch signal lines are disposed on the same layer;
a first electrode of the first electrodes and a second electrode of the second electrodes adjacent to each other in a second direction crossing the first direction and disposed in a same column form a channel for generating position information by a mutual capacitive method;
the touch sensor controller is configured to store a ghost table comprising a ghost ratio for each channel for a touch position for each column, and is further configured to remove a ghost from measured touch data by using the ghost table to generate final touch data; and
the ghost is generated between adjacent columns of the plurality of columns.

2. The touch sensor device of claim 1, wherein:
the ghost is generated by a mutual capacitance between a second touch signal line of a first column among the plurality of columns and one selected from a first electrode and a first touch signal line of a second column adjacent to the first column.

3. The touch sensor device of claim 1, wherein:
the ghost table further comprises a ghost ratio for each channel for a touch position for each column.

4. The touch sensor device of claim 1, wherein:
the ghost table further comprises a representative ghost ratio for a touch position for each column.

5. The touch sensor device of claim 4, wherein:
the representative ghost ratio is an average value of the ghost ratios for each channel for the touch position.

6. The touch sensor device of claim 1, wherein:
the ghost table comprises a first representative ghost ratio and a second representative ghost ratio for a touch position for each column.

7. The touch sensor device of claim 6, wherein:
the first representative ghost ratio is an average value of the ghost ratios, the average value of the ghost ratios being equal to or larger than an average ghost ratio, the average ghost ratio being an average of the ghost ratios for each channel for the touch position, and
the second representative ghost ratio is an average value of the ghost ratios smaller than the average ghost ratio.

8. The touch sensor device of claim 1, wherein:
the touch sensor controller is disposed at any one side of an upper end and a lower end of a touch panel on which the first electrode patterns and the second electrode patterns are disposed.

9. The touch sensor device of claim 8, wherein:
the touch sensor controller is configured to apply a detection input signal to the second touch signal lines, and is configured to obtain measured touch data for all of the channels by receiving a detection output signal from the first touch signal lines.

10. The touch sensor device of claim 9, wherein:
the measured touch data comprises a variation amount of mutual capacitance for each channel.

11. The touch sensor device of claim 9, wherein:
the touch sensor controller is configured to confirm a channel value of each channel in the measured touch data, and is configured to detect a channel having a channel value equal to or larger than a threshold value as a touch position.

12. The touch sensor device of claim 11, wherein:
the touch sensor controller is configured to sequentially search for a touch position from a lower side to an upper side of the touch panel.

13. The touch sensor device of claim 11, wherein:
the touch sensor controller is configured to sequentially search for a touch position from an upper side to a lower side of the touch panel.

14. The touch sensor device of claim 11, wherein:
the touch sensor controller is configured to confirm a ghost ratio for each channel for the touch position, calculate a ghost value by multiplying the channel value of the touch position by the ghost ratio for each channel, and subtract the ghost value from the channel value of each channel to remove a ghost.

15. A display device, comprising:
a display panel configured to display an image in a display area;
a plurality of columns, each column extending in a first direction and comprising:

first electrode patterns disposed in a touch area overlapping the display area, and comprising physically separated first electrodes;
second electrode patterns arranged in the touch area and comprising physically separated second electrodes;
first touch signal lines electrically connected to the first electrodes; and
second touch signal lines electrically connected to the second electrodes; and
a touch sensor controller electrically connected with the first touch signal lines and the second touch signal lines,
wherein:
the first electrode patterns, the second electrode patterns, the first touch signal lines, and the second touch signal lines are disposed on the same layer;
a first electrode of the first electrodes and a second electrode of the second electrodes adjacent to each other in a second direction crossing the first direction and disposed in a same column form a channel for generating position information by a mutual capacitive method;
the touch sensor controller is configured to store a ghost table comprising a ghost ratio for each channel for a touch position for each column, and is further configured to remove a ghost from measured touch data by using the ghost table to generate final touch data; and
the ghost is generated between adjacent columns of the plurality of columns.

16. The display device of claim 15, wherein:
the ghost is generated by a mutual capacitance between a second touch signal line of a first column among the plurality of columns and one selected from a first electrode and a first touch signal line of a second column adjacent to the first column.

17. The display device of claim 15, wherein:
the ghost table further comprises a ghost ratio for each channel for a touch position for each column.

18. The display device of claim 17, wherein:
the touch sensor controller is configured to apply a detection input signal to the second touch signal lines, and is configured to obtain measured touch data for all of the channels by receiving a detection output signal from the first touch signal lines.

19. The display device of claim 18, wherein:
the touch sensor controller is configured to confirm a channel value of each channel in the measured touch data, and is further configured to detect a channel having a channel value equal to or larger than a threshold value as a touch position.

20. The display device of claim 19, wherein:
the touch sensor controller is configured to confirm a ghost ratio for each channel for the touch position, calculate a ghost value by multiplying the channel value of the touch position by the ghost ratio for each channel, and subtract the ghost value from the channel value of each channel to remove a ghost.

* * * * *